(12) United States Patent
Deng et al.

(10) Patent No.: US 9,712,233 B1
(45) Date of Patent: Jul. 18, 2017

(54) FULL-DUPLEX RF LINK FOR MULTI-CHANNEL WIDEBAND COMMUNICATION

(71) Applicant: Bascom Hunter Technologies, Inc., Baton Rouge, LA (US)

(72) Inventors: Yanhua Deng, Minneapolis, MN (US); Andrew McCandless, Baton Rouge, LA (US)

(73) Assignee: Bascom Hunter Technologies, Inc., Baton Rouge, LA (US)

(*) Notice: Subject to any disclaimer, the term of this patent is extended or adjusted under 35 U.S.C. 154(b) by 11 days.

(21) Appl. No.: 14/851,743

(22) Filed: Sep. 11, 2015

Related U.S. Application Data

(60) Provisional application No. 62/051,007, filed on Sep. 16, 2014.

(51) Int. Cl.
| | | |
|---|---|---|
| *H04B 10/11* | (2013.01) | |
| *H04B 10/112* | (2013.01) | |
| *H04B 10/114* | (2013.01) | |
| *H04B 10/40* | (2013.01) | |

(52) U.S. Cl.
CPC .......... *H04B 10/11* (2013.01); *H04B 10/112* (2013.01); *H04B 10/114* (2013.01); *H04B 10/1123* (2013.01); *H04B 10/1143* (2013.01); *H04B 10/40* (2013.01)

(58) Field of Classification Search
None
See application file for complete search history.

(56) References Cited

U.S. PATENT DOCUMENTS

| 5,444,864 A | 8/1995 | Smith |
|---|---|---|
| 6,539,204 B1 | 3/2003 | Marsh et al. |
| 7,366,244 B2 | 4/2008 | Gebara et al. |
| 7,561,803 B2 | 7/2009 | Burns et al. |
| 8,682,170 B2 | 3/2014 | Prucnal |
| 8,693,810 B2 | 4/2014 | Suarez et al. |
| 2012/0201153 A1* | 8/2012 | Bharadia ............... H04B 1/525 370/252 |
| 2013/0093035 A1 | 4/2013 | Fertig et al. |
| 2013/0308732 A1 | 11/2013 | Kpodzo et al. |
| 2013/0308940 A1 | 11/2013 | Kpodzo et al. |
| 2013/0309975 A1 | 11/2013 | Kpodzo et al. |

OTHER PUBLICATIONS

J. Tsimbinos, "Identification and Compensation of Nonlinear Distortion," University of South Australia, 1995.
Y. Yang, A. Motafakker-Fard, and B. Jalali, "Linearization of ADCs via digital post processing," 2011 IEEE Int. Symp. Circuits Syst., No. 5, pp. 989-992, May 2011.

(Continued)

*Primary Examiner* — Darren E Wolf
(74) *Attorney, Agent, or Firm* — Jones Walker LLP

(57) ABSTRACT

A method and apparatus for cancelling interference of an interfering transmit signal. The method includes the steps of (a) transmitting an RF transmit signal from a transceiver, (b) optically modulating the RF transmit signal, (c) optically modulating a RF receive signal; (d) demodulating an optical signal back to an RF signal using an optical-electrical balanced receiver and directing to the transceiver, and (e) demodulating the optical transmit signal back to RF transmit signal.

18 Claims, 10 Drawing Sheets

(56) References Cited

OTHER PUBLICATIONS

Jain, M., Choi, J. I., Kim, T., Bharadia, D., Seth, S., Srinivasan, K., . . . & Sinha, P. (Sep. 2011). Practical, real-time, full duplex wireless. In Proceedings of the 17th annual international conference on Mobile computing and networking (pp. 301-312). ACM.
Johnson, L. M., Roussell, H. V., & Betts, G. E. (Feb. 1993). Interferometric modulators for an adaptive nulling system. In Fibers' 92 (pp. 50-54). International Society for Optics and Photonics.
Lind, R., Prazenica, R. J., & Brenner, M. J. (2005). Estimating nonlinearity using volterra kernels in feedback with linear models. nonlinear dynamics, 39(1-2), 3-23.
Sonnenschein, A., & Hutchinson, W. (1990). A design for an electro-optic implementation of a wideband nulling system. In Military Communications Conference, 1990. MILCOM'90, Conference Record, A New Era. 1990 IEEE (pp. 742-748). IEEE.
U.S. Appl. No. 13/293,072 (Adaptive Techniques for Full Duplex Communications), filed Nov. 9, 2011.

\* cited by examiner

FULL-DUPLEX RF LINK FOR MULTI-CHANNEL WIDEBAND COMMUNICATION

CROSS-REFERENCE TO RELATED APPLICATION

This application claims the benefit under 36 USC §119(e) of U.S. Provisional Application Ser. No. 62/051,007, filed Sep. 16, 2014, which is incorporated by reference herein in its entirety.

STATEMENT REGARDING FEDERALLY SPONSORED RESEARCH OR DEVELOPMENT

This invention was made with government support under contract number N66001-12-P-5105 awarded by the US Navy Space and Naval Warfare Systems Command. The government has certain rights in the invention.

FIELD OF THE INVENTION

The present invention relates to the field of wireless communications. More particularly, many embodiments relate to active cancellation of wireless transmissions coupled in a wireless receiver.

BACKGROUND

Wireless communications use various forms of signals, such as radio frequency (RF) signals, to transmit data. As a signal travels from a broadcasting transmitter, the signal loses power or attenuates. The signal also encounters various forms of interference along the signal path which introduce noise into the signal. A transmitter that is in relatively close proximity to a receiver can introduce significant noise into the signal being received (i.e., co-site interference). Devices which include both a transmitter and a receiver typically attempt to isolate the transmitter from the receiver so that the co-site interference does not overpower the receiver.

Most RF communication systems utilize frequency-division duplexing (FDD) where the uplink and downlink are on different RF spectral bands, in order to simplify the co-site interference problem. For example, the maximum power for a typical base station transmission is 30 dBm, while the receiver sensitivity or minimum required receive power is −100 dBm. Therefore, the required isolation can be as high as 130 dB. Traditionally, bandpass filters are used to isolate the high power co-site interference from the receive path to allow for reception. If a traditional receiver were operating in the spectrum 707-710 MHz, a bandpass filter would be used to remove all frequencies outside of the 707-710 MHz band. However, this is not possible if a single link is processing multiple bands. For example, in the case of the approximately 20 existing and planned LTE bands implemented over the spectrum between 455-2140 MHz, the high power transmissions are interspersed over the entire spectrum. Approaches more efficient than simply using a bandpass filter are needed for handling the high power level associated with these types of co-site transmissions, which can be in the same band or in different bands.

DETAILED DESCRIPTION

Many embodiments of the present invention relate to a RF communication system capable of simultaneously transmitting and receiving over multiple bands and which utilizes some form of optical cancellation. These embodiments most generally comprise one or more wideband RF transceivers, and a photonic interference canceller (sometimes also referred to as an optical cancellation circuit), and at least one wideband antenna. As used in reference to many embodiments described herein, "transceiver" means a device comprising both a transmitter and a receiver (or the functionality of a transmitter and receiver) which are operationally combined and share common circuitry or a single housing. As used in many below described examples, "wideband" in reference to a signal means a signal bandwidth exceeding 1 MHz. Thus, a transceiver may be considered "wideband" when it operates using signals exceeding 1 MHz in bandwidth. In some embodiments, the interference may be "self-interference," i.e., where the interference is caused by the transmit signal from the same transceiver which is collecting the receive signal. In other embodiments, the interfering transmit signal is from another transmitter.

Figure 1B:
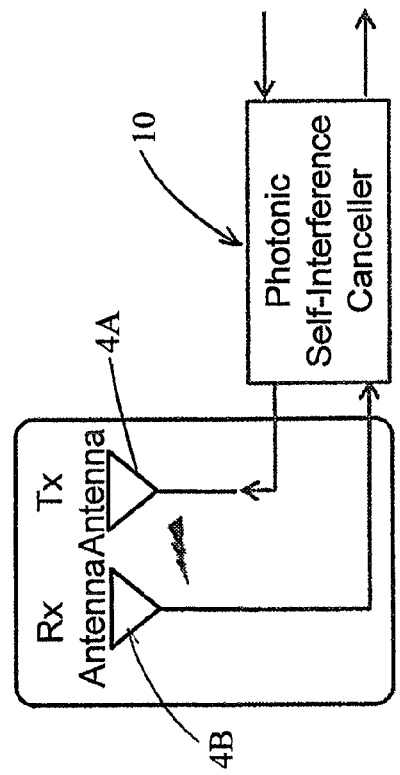
FIGS. 1A and 1B illustrate alternative antenna configurations utilized in certain embodiments.
Figure 1A:
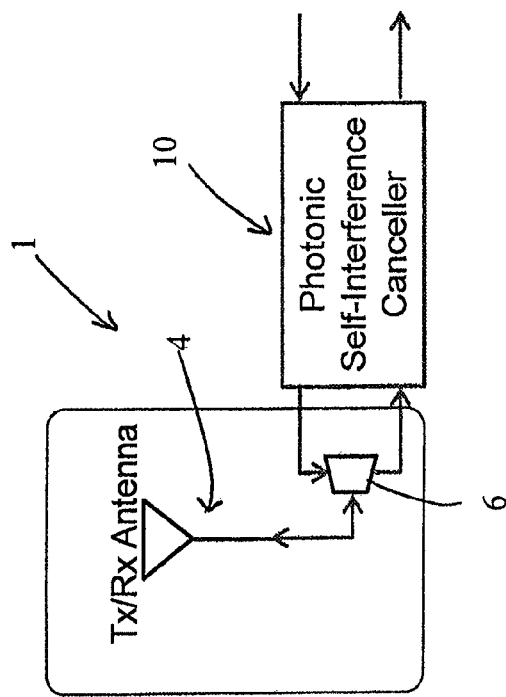

FIGS. 1A and 1B illustrate two alternative methods by which a photonic interference canceller 10 may interface with the antenna(s). FIG. 1A shows a single antenna configuration, where the antenna 4 is capable of transmitting and receiving simultaneously. The transmit signal from the canceler 10 is combined with the receive signal from the antenna through a bidirectional and wideband coupler 6. In this configuration, the self-interference is caused by insufficient isolation between the ports in the coupler. FIG. 1B shows a two antenna configuration, where one antenna 4A is used to transmit and the other antenna 4B is used to receive. The over-the-air transmit signal is coupled to the receive antenna. The distance between the antennas and their construction (e.g., directivity) will provide some isolation between the transmit signal and the intended receive signal.

In many of the embodiments described herein, antenna 4 will be considered a "wideband" antenna. For example, certain embodiments consider an antenna to be wideband if it is capable of transmitting and/or receiving signals having a bandwidth greater than 1 MHz. In certain embodiments, the antenna(s) operating characteristics include a wideband performance for more than 1 MHz passband where the gain and radiation pattern are about 1 dB in variation. In other embodiments, the antenna(s) operates with a bandwidth greater than about 1 MHz over multiple passbands across the ultra high frequency (UHF) range.

Although many different conventional or future developed wideband antennas could be employed in different embodiments, specific examples of antenna structures include horn antennas, helical antennas, and spiral antennas. Horn antennas have a linear transfer function and also are directional. This allows horn antennas to be used to subdivide regions into sectors, such that the sectors can then be isolated to provide greater spectrum efficiency. Characteristics for one suitable horn antenna include:
Frequency: 0.5-2 GHz
Nominal Gain: 8-13.5 dBi
3 dB Beamwidth: 70°–25°
Typical VSWR: <3:1
Power Handling: 250 W continuous wave (cw)
Dimensions: 16"W×16"D×22"H A specific helical antenna design example is based on a two-element, non-uniform, helical antenna which is positioned with the transmit element on top and the receive element on the bottom. This orientation provides a compact design, as well as a high level of isolation between the transmit and receive elements. One embodiment is optimized for part of the UHF band (e.g., 1.3 GHz to 2 GHz), but it is also possible to create a design to allow for other parts of the UHF band or the entire UHF band (e.g., the 300 MHz to 3 GHz band as defined by the International Telecommunications Union). These antennas generally have a frequency ratio of 1.55:1 meaning that the maximum frequency would be approximately 1.55 times the minimum frequency. Characteristics for one suitable helical antenna include:
Frequency: 1.3-2 GHz
Nominal Gain: 8-13.5 dBi
3 dB Beamwidth: 45°
Typical VSWR: <3:1
Power Handling: 250 W cw
Dimensions: 13" Dia.×80" Height One example of a spiral antenna would have at least 2 arms to meet the frequency of operation specification. Two spiral antennas would be preferred, one for transmit and one for receive functionality. A demonstrated 6" diameter two-arm meanderline slot spiral antenna will operate from 250 MHz upwards to several gigahertz and demonstrates advantageous low-frequency gain values. Characteristics for one suitable spiral antenna include:
Frequency: 1.3-2 GHz
Nominal Gain: 3-13.5 dBi
3 dB Beamwidth: 45°
Typical VSWR: <3:1
Power Handling: 250 W c.w.
Dimensions: 8" Dia.×10" Height
Although most antennas discussed herein would be considered "wideband," this should not be read as excluding possible embodiments using antennas which are not considered wideband.

Figure 2A:
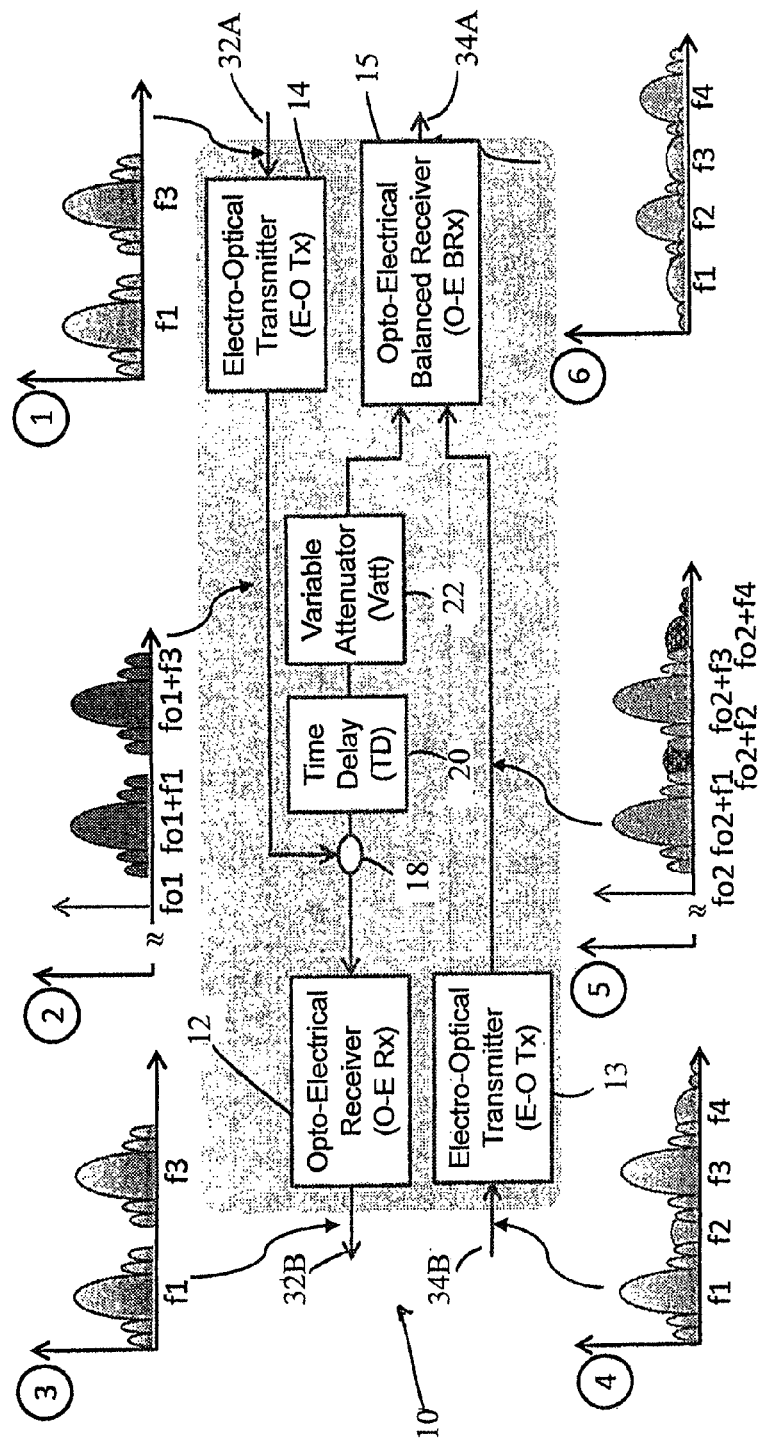
FIGS. 2A and 2B illustrate alternate embodiments of photonic self-interference cancellers.

FIG. 2A illustrates the architecture of one embodiment of the photonic self-interference canceller 10. FIG. 2A also includes a series of frequency/amplitude graphs to illustrate the canceller's operating principle on the signal's spectrum. One or more transmit signals 32A (e.g., a signal transmitted from a transmitter or transceiver) is first modulated onto an optical carrier in the electro-optical transmitter (E-O-Tx) 14. As indicated in graph (1), multiple transmit signals at different center frequencies can be modulated simultaneously in a single modulator. As used herein, "transmit signal" generally connotes an outgoing signal from a transceiver, whether in the RF domain or converted to another (e.g., optical) domain, including amplified or attenuated forms of the signal. Likewise, a "receive signal" refers to an incoming signal directed to a transceiver, whether in the RF domain or converted to another (e.g., optical) domain, including amplified or attenuated forms of the signal.

The modulated optical transmit signal (graph (2)) is split into two paths at optical splitter 18. One path is connected to an opto-electrical receiver (O-E Rx) 12 which demodulates the transmit signal back to RF domain, as shown in graph (3), which forms the transmit signal component 32B directed to the antenna. The other path is connected to an optical time delay device 20 and a variable attenuator 22 to be used as a reference signal for cancellation. In many embodiments, the signal component directed to optical time delay device 20/variable attenuator 22 is a fraction of the power of the signal component directed to O-E Rx 12, for example 3 to 20 dB lower than the signal component directed to O-E Rx 12.

The receive signal 34B from the antenna contains both the signal of interest and self-interference leaking from the higher power transmit signal as suggested by graph (4). Using a second E-O Tx 13 with different laser source, receive signal 34B is modulated into the optical domain at a different carrier frequency with the signal suggested in graph (5), i.e., different lasers, unless phase locked, typically have different wavelengths and thus different carrier frequencies. The self-interference in the received signal 34B can be leakage either through a coupler (e.g., see FIG. 1A) or from over-the-air coupling between the transmit and receive antennas (e.g., FIG. 1B). Even in the case where the transmit and receive signals have different center frequencies, the strong leak-through of the transmitting signal can still easily saturate the receive signal with the sidebands. The delayed and attenuated transmit signal is connected to the inverted input of an O-E balanced receiver (O-E BRx) 15. O-E BRx consists of two matched photodiodes that provides inverted and non-inverted electrical signals, and the output of the receiver is the difference of the signals detected by two photodiodes. The receive signal is connected to the non-inverted input of the O-E BRx. The two signals are first demodulated back into the RF domain separately by the two photodiodes and then are subtracted analogically. The output of the O-E BRx 15, the receive signal 34A, is directed to the transceiver and is represented by graph (6).

Wide spread optical components used in telecommunications operate in the hundreds of THz frequency range. In comparison to the RF electronic components, the optical components can provide many orders of magnitude wider bandwidth. The entire RF and microwave frequency bands (10 kHz-100 GHz) are only a fraction of the potential optical bandwidth. The optical time delay operates on the order of the optical wavelength in nanometers, which is less than a millionth of the wavelength of the RF and microwave signals in the millimeter range. One type of time delay device or component is an optical device that adjusts the optical path length to create a time difference or phase change between the input signal and the output signal. One example of such an optical delay line is a free space delay line where the distance between to connectors can be adjusted by a motor (e.g., an ODL-650, available from OZ Optics, Ottawa, ON). Thus, the control mechanism for this type of free space delay line is based on electrical pulses. Consequently, the optical time delay can precisely tune the delay of the transmit signal.

The variable attenuators are tunable optical devices that reduce the power of a signal without appreciably distorting its waveform. One variable optical attenuator is based on a microelectro-mechanical system which may be voltage controlled and tuned continuously. Thus the attenuation precision is only dependent on the step size of the voltage, which is the control input for the variable attenuator and which can be more than $2^{16}$ bits precision with current digital to analog conversion technology (e.g., an AD5369, available from Analog Devices, Inc. of Norwood, Mass.). The fine matching in both delay and amplitude of the two paths of the transmit signal leads to a high level of cancellation. As used in many embodiments, an "electro-optical transmitter" may be any device for converting a signal in a non-optical domain (e.g., microwave, RF, etc.) to an optical domain. Examples include a laser diode as a light source with either an electro-optical modulator or electro-absorption modulator. Likewise, an "opto-electrical receiver" may be any device for converting a signal in an optical domain to a non-optical domain (e.g., microwave, RF, etc.) Examples include PIN or avalanche photodiodes. An "opto-electrical balanced receiver" consists of two matched photodiodes that provide inverted and non-inverted electrical signals, and the output of the receiver is the difference of the signals detected by two photodiodes. The Splitters/Couplers may be any device (typically passive) which distributes or combines signals.

In one nonlimiting example, E-O-Tx 13 and 14 are DLT5WC1FMM available from Linear Photonics, Hamilton, N.J.; O-E-Rx 12 is DLR5WC1FMM available from Linear Photonics, Hamilton, N.J.; O-E BRX is a DSC-R405 from Discovery Semiconductors Inc., Ewing, N.J.; TD 20 is a ODL-650 available from OZ Optics, Ottawa, ON; Vatt 22 is a MMVOA-1-1550-S-9/125-3A3A-0.25-1 available from OZ Optics, Ottawa, ON; Splitter 18 is a SDW13550129UC available from Fibertronics of Florida Inc., Melbourne, Fla.

Figure 2B:
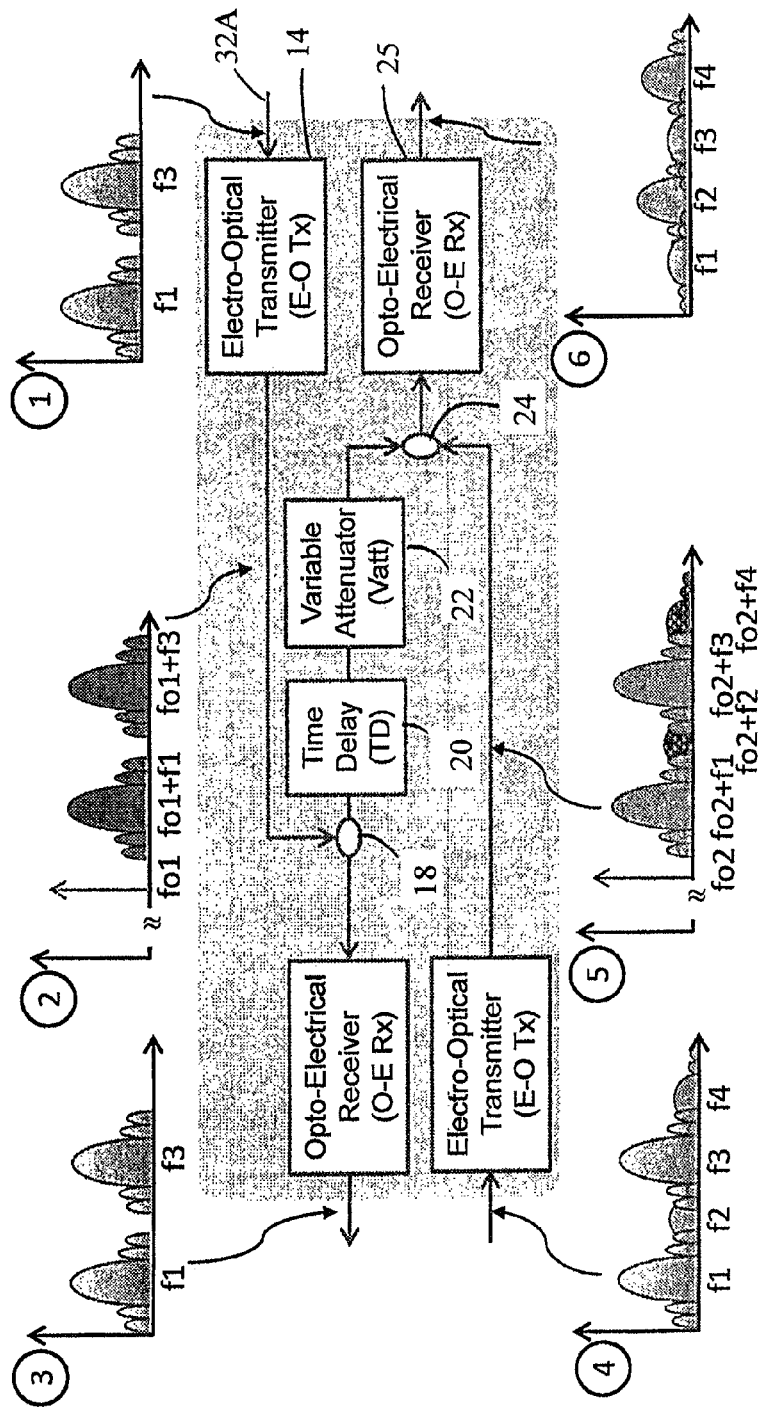
Figure 3:
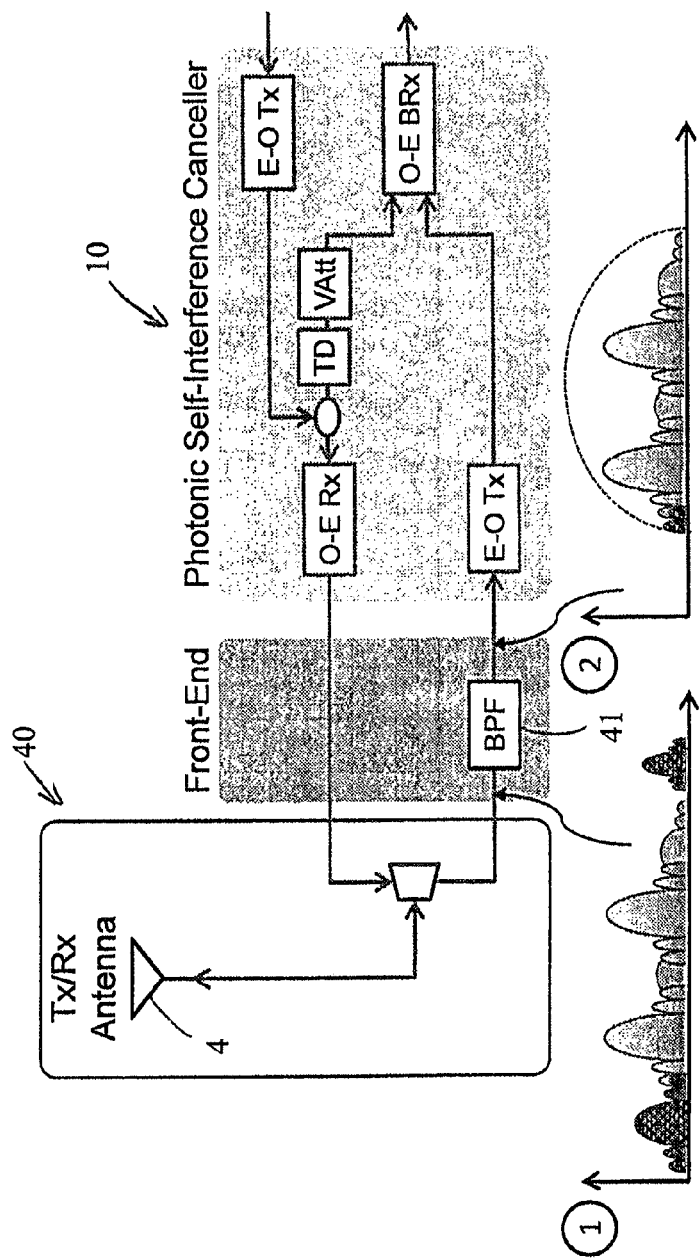
FIG. 3 illustrates one embodiment of the communication system with a photonics self-interference canceller and front end processing.

FIG. 2B illustrates a slight modification from the embodiment seen in FIG. 2A. In FIG. 2B, the transmit signal 32A is inverted at E-O Tx 14 before a split portion of the signal is directed to time delay 20 and variable attenuator 22. Rather than a balanced O-E receiver, the FIG. 2B embodiment combines the delayed, attenuated transmit signal with the receive signal at coupler 24, thereby performing the cancellation function. The resulting signal is then directed to a regular opto-electrical receiver (O-E Rx) 25, e.g., an opto-electrical receiver having a single photodiode FIG. 3 illustrates another embodiment where a RF front-end 40 is positioned between the photonic self-interference canceller 10 and the antenna(s) 4. For the case where the signal of interest at the receive path falls within certain frequency range, a bandpass filter (BPF) 41 may be implemented in the front end circuit to remove any unwanted signal outside of the frequency band as suggested by the graphs (1) and (2).

In certain embodiments, the transmit and receive signals are in the same or close, e.g. less than 25 kHz, in the RF spectrum. In other embodiments the transmit and receive signals are separated by 100 kHz or more. In still other embodiments, there may be multiple transmit and receive signals that are in multiple bands that are interspaced between each other. For example, a time division duplex (TDD) band between 1616 MHz and 1626 MHz may operate between a frequency division duplex (FDD) band where the downlink is at 1530 to 1548 MHz and the uplink is between 1627 and 1660 MHz. Additionally, there may be embodiments where multiple transmit and receive signals are in multiple bands that are inter-spaced between each other over a frequency band greater than 2 MHz, e.g., where the signals are centered at 1627 MHz, 1629 MHz, and 1639 MHz.

Figure 4:
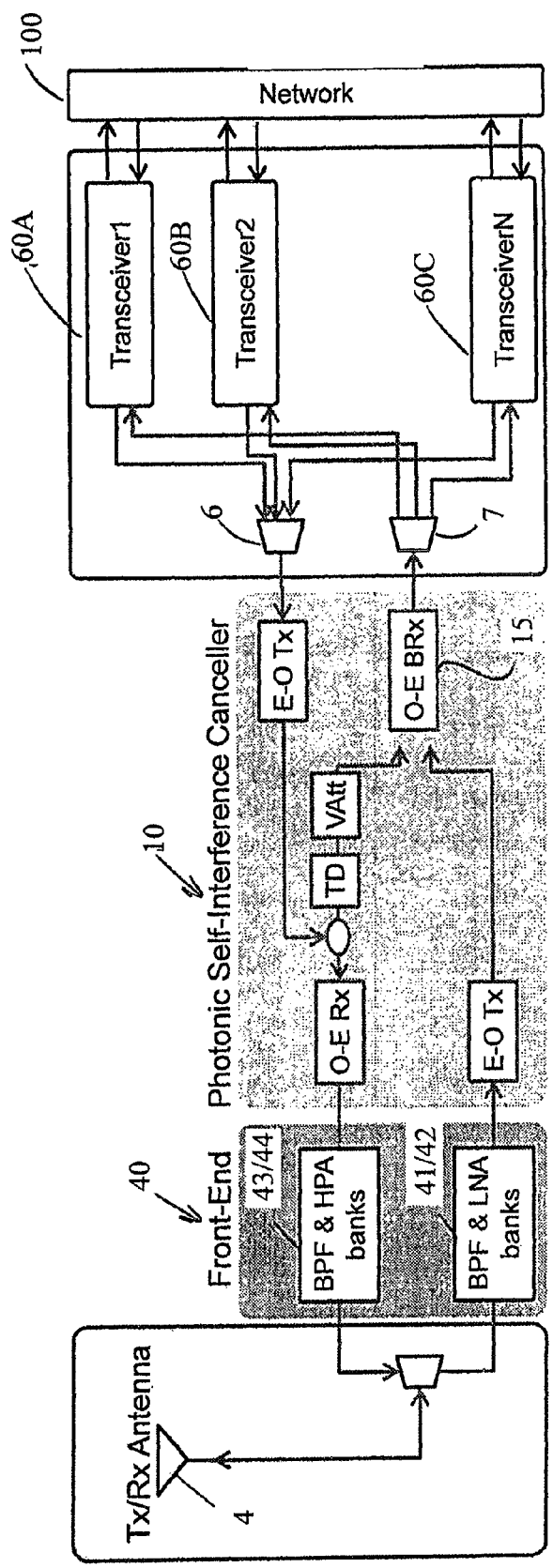
FIG. 4 illustrates a communication system where the photonics self-interference canceller aggregates signals from multiple transceivers.

FIG. 4 illustrates a further embodiment of the communication system generally including the antenna 4, RF front-end circuits 40, photonic self-interference canceller 10, and commercial off-the-shelf transceivers 60. Transmit signals from multiple transceivers with different properties in frequency, bandwidth, and modulation format can be aggregated at coupler 6 in order to be modulated using a single E-O Tx 14. These signal properties among the transceivers can be controlled and coordinated through the network 100 from a central or network controller (not shown). The network controller may act to adjust the parameters of the transceivers through the Ethernet, for example parameters such as the frequency, signal power, signal types, data rate, etc. One possible scenario that the system can accommodate is transceiver 60A operating in FDD channel number 12, using uplink frequencies 699-716 MHz and downlink frequencies 729-746 MHz, having 1.4-10 MHz channel bandwidth; while transceiver 60B is operating in FDD channel number 14, using uplink frequencies 788-798 MHz and downlink frequencies 758-768 MHz, having either 5 or 10 MHz channel bandwidth; and transceiver 60C is operating in FDD channel number 25, using uplink frequencies 1850-1915 MHz and downlink frequencies 1930-1995 MHz, having 1.4-20 MHz channel bandwidth.

The receive signal free of self-interference from the O-E BRx 15 can be divided by splitter 7 to different transceivers 60. In the front-end, multiple high power amplifiers (HPAs) 44 and BPFs 43 in the transmit path, and multiple linear amplifiers (LNAs) 41 with BPFs 42 in the receive path, can be configured to the operative parameters based on the transceivers. For a system that is configured to accommodate FDD channels in 700-2000 MHz range, the RF components in the front-end can be selected to operate in this frequency range. In one nonlimiting example, transceivers 60 may be USRP X300 available from Ettus Research, Santa Clara, Calif.; coupler 6 and splitter 7 may be a RPD-8-S-R available from Miteq, Inc., Hauppauge, N.Y.

Figure 5:
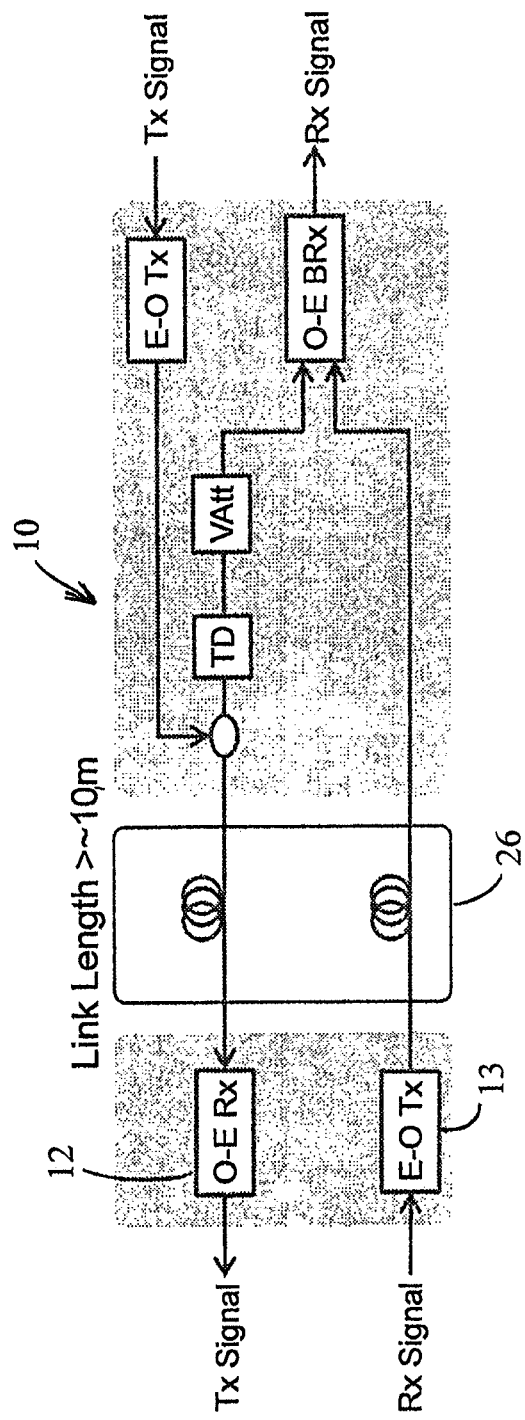
FIG. 5 illustrates a photonics self-interference canceller configured for long distance transmission.

FIG. 5 illustrates another embodiment of photonic self-interference canceller 10. In this example, O-E Rx 12 and E-O Rx 13 are joined to the other components of canceller 10 by extended fiber optic link 26. In preferred embodiments, extended fiber optic link 26 is at least 10 meters in length, i.e., each of O-E Rx 12 and E-O Rx 13 have at least 10 meters of fiber optic cable between themselves and other components of canceller 10. The length of extended fiber optic link 26 could conceivably extend for many kilometers, with certain embodiments of extended fiber optic link 26 being cable of any length or range of lengths between 10 meters and 10 kilometers. The low propagation loss and light weight of the optical fibers enables the flexibility in the link length. As one example, the extended fiber optic length is advantageous in situations where the transceivers can be housed in an enclosed area on the ground while a remote antenna(s) are position on a pole or tower.

Figure 6A:
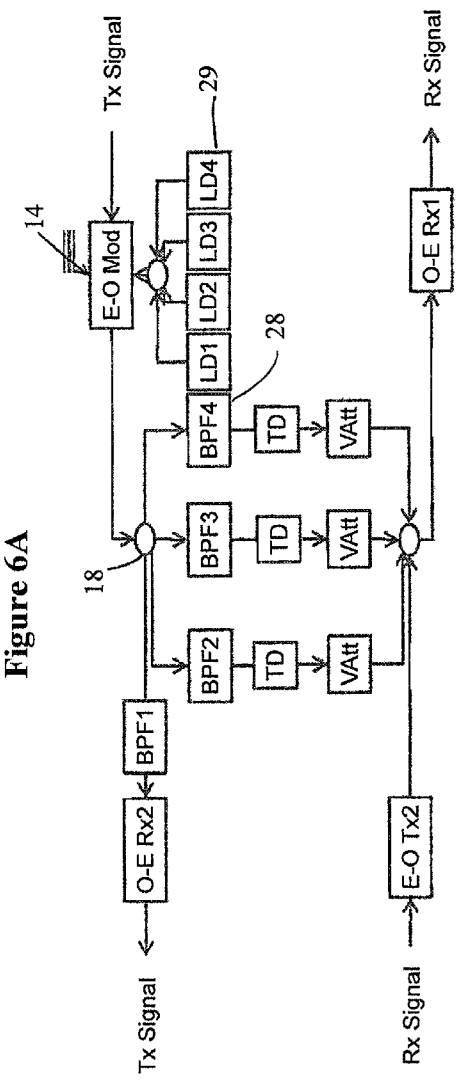
FIGS. 6A and 6B illustrate a photonics self-interference canceller with multipath compensation.
Figure 6B:
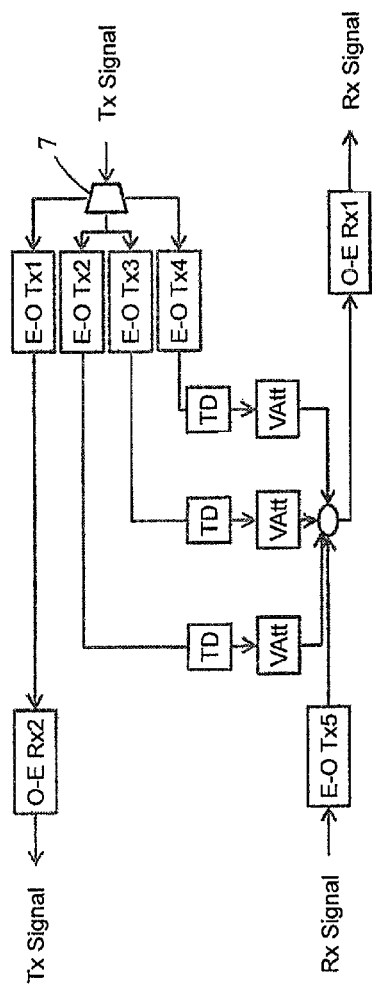

FIGS. 6A and 6B illustrate examples of multipath compensation using a plurality of optical paths. Multipath exists when the self-interference is caused by over-the-air coupling between a transmit antenna and a receive antenna. In addition to a direct line of sight path, an over-the-air signal might be reflected off of near-by objects, resulting in multiple delayed and attenuated versions of the signals being aggregated onto the receiving antenna, thus acting as multipath interference.

FIG. 6A shows an example of using one electro-optical transmitter E-O Tx 14 to modulate the transmit signal, and divide the signal into four paths with splitter 18. It is desirable to minimize the noise caused by adding multiple optical signals from the same source. One solution to this undesirable noise is to combine multiple laser sources 29 with different wavelengths to one electro-optical based intensity modulator. In one nonlimiting example, the laser diodes can be continuous wave distributed feedback lasers with different center wavelengths: SLT5410-QAX/GM2-F320 with 1552 nm, SLT5410-QAX/GM2-F280 with 1555 nm, SLT5410-QAX/GM2-F260 with 1557 nm, and SLT5410-QAX/GM2-F230 with 1559 nm, all from Sumitomo Electric of Torrance, Calif. The optically combined signal from all four laser diodes can be modulated using an electro-optical based intensity modulator, IM-1550-12-a, from Optilab, LLC of Phoenix, Az.

The combined signal can then split into different paths at splitter 18 and ultimately into different wavelengths as each path includes an optical bandpass filter (BPF) 28 limiting the signal to the frequency band desired for that path.

FIG. 6B shows another example of multipath compensation. In this embodiment, the transmit signal is split into four paths using an RF splitter 7. Each path is modulated onto an optical carrier using a separate electro-optical transmitter. With each E-O Tx having distinct center wavelengths, the optical signal can be combined with minimum noise.

Figure 7:
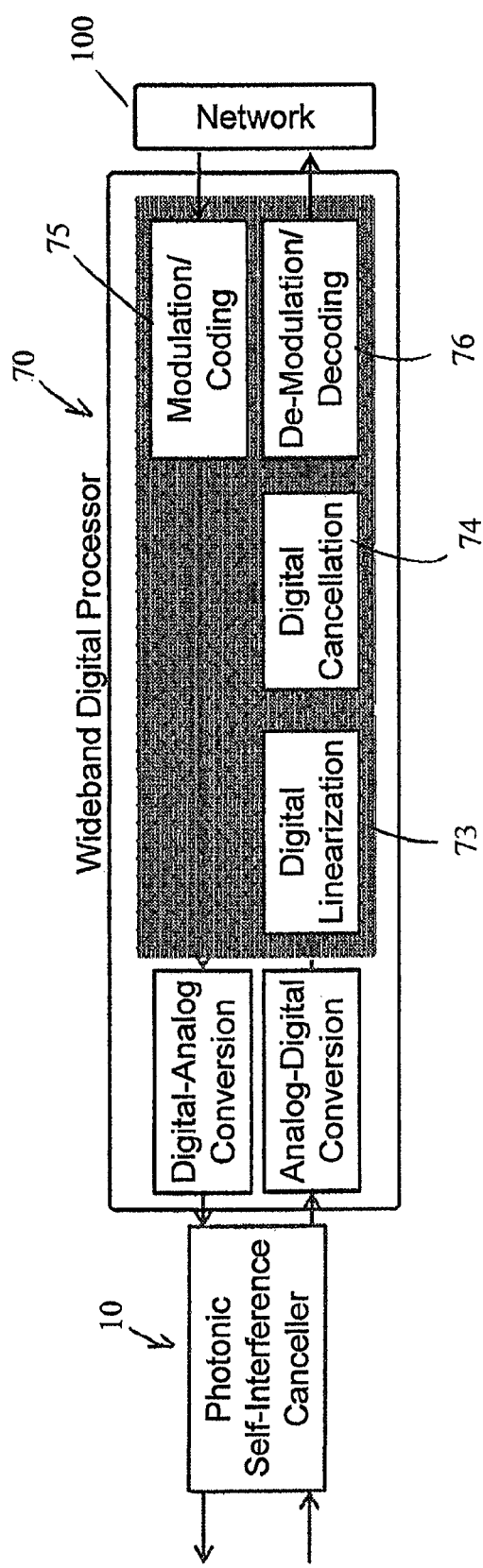
FIG. 7 illustrates a photonics self-interference canceller with a single digital processor capable of multiple wideband signals operation.

FIG. 7 illustrates an embodiment in which a wideband digital processor 70 is located between the photonic self-interference canceller 10 and the network 100. In this embodiment, processor 70 takes on the functionality of a transceiver and may be a conventional processor such as a MAX2580, a LTE small-cell MIMO transceiver from Maxim Integrated of San Jose, Calif. The digital to analog converters (DACs) and analog to digital converters (ADCs) are capable of processing multiple wideband signals simultaneously in order to be compatible with the bandwidth and the frequency range of the photonic self-interference canceller 10. For example, if the signals are at 1616 MHz and 1626 MHz, a high speed or wideband DAC/ADC, capable of processing 100 MHz signal, can process 1616 MHz and 1626 MHz simultaneously. In one embodiment DACs 71 are DAC38J84 and ADCs 72 are ADS5474 both from Texas Instruments of Dallas, Tex.

Processor 70 may run a number of routines or modules in carrying out signal processing steps. FIG. 7 suggests a digital linearization routine 73, a digital cancellation routine 74, modulation/coding routine 75, and de-modulating/decoding routine 76. One digital linearization routine 73 based on the approach in [1] is described with reference to FIG. 8. This figure illustrates one linearization process based on Volterra series that can be incorporated in the digital processor. Although not explicitly shown in FIG. 8, the algorithm starts by first by obtaining the initial Volterra kernel, $(H_0, \ldots H_{m,m})_0$, an example for $2^{nd}$ order kernels over m frequencies. The first order Volterra kernel $H_1(f)$ can be obtained from the frequency response of the system, and $H_2(f_1, f_2)$ can be obtained by first sweeping $f_2$ while fixing $f_1$. The prominent intermodulation distortion (IMD) products would be at frequencies $f_1+f_2, f_2-f_1, 2f_1-f_2, 2f_2-f_1$. The response y(t) can be obtained by changing the input amplitude based on Vandermonde matrix [2], as indicated in equation (1). These values can be saved in a look-up table (LUT), and used for iterative updates. In a static environment, and with known Volterra kernels, the signal can be adjusted without real time tracking. One iteration with using the initial kernels can be selected as the response.

$$\begin{bmatrix} r_1 \\ r_2 \end{bmatrix} = \begin{bmatrix} a_1 & a_1^2 \\ a_2 & a_2^2 \end{bmatrix} \begin{bmatrix} y_1 \\ y_2 \end{bmatrix} + \begin{bmatrix} e_1 \\ e_2 \end{bmatrix}. \quad (1)$$

In a dynamic environment, y(k) can be continuously estimated with updated kernel parameters. Assuming that the wideband nonlinear photonics system is time invariant and causal, the system response can be described using a Volterra series, $$y(t) = \Sigma_{n=0}^{\infty} y_n, \quad (2) \text{ and}$$

$$y_n(t) = \sum_{i_1=-m}^{m} \cdots \sum_{i_m=-m}^{m} a_i \cdots a_n H_n(f_1 \cdots f_n) \exp\left(j2\pi \sum_{j=1}^{n} f_{ij} t\right) \quad (3)$$

Figure 8:
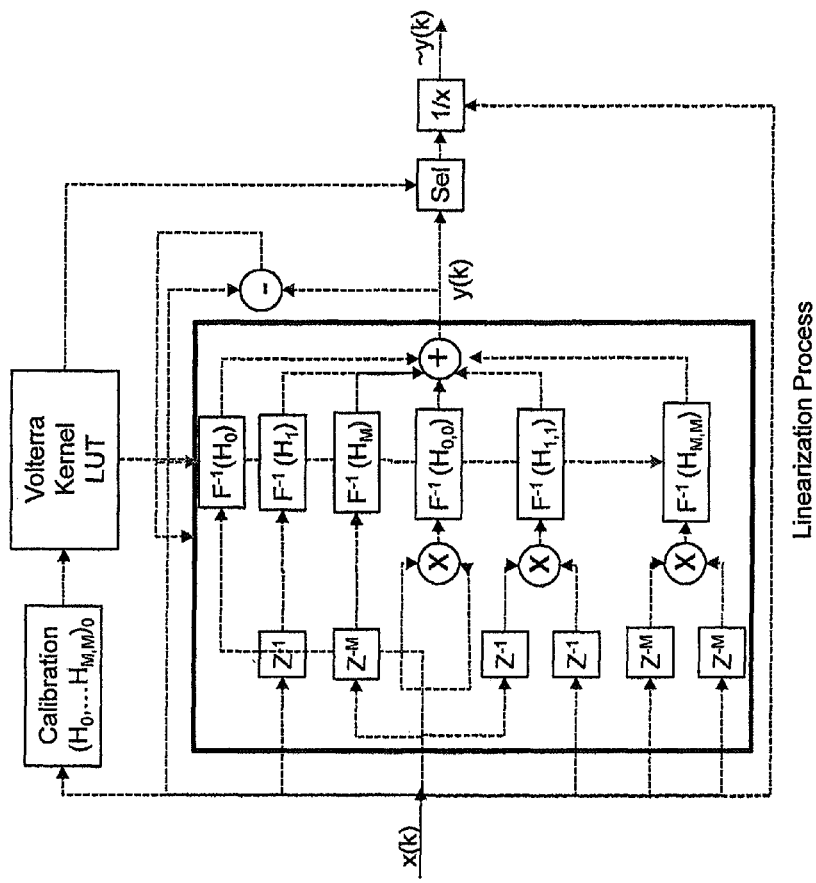
FIG. 8 illustrates a linearization algorithm used in one embodiment of the communication system.

$H_n$ is the n-th order Volterra kernel in frequency domain. The time domain implementation of the y(t) by taking the inverse Fourier transform of H, is shown in FIG. 8.

In this $2^{nd}$ order example, the various delayed input signals ($Z^{-1}$ to $Z^{-M}$) are multiplied with corresponding Fourier transform of the kernels. The calculated y(k) is then compared to the input in order to minimized the errors. This iterative implementation can be selected for a dynamic system. The last step in the algorithm is normalizing y(k) to the input signal.

Figure 9:
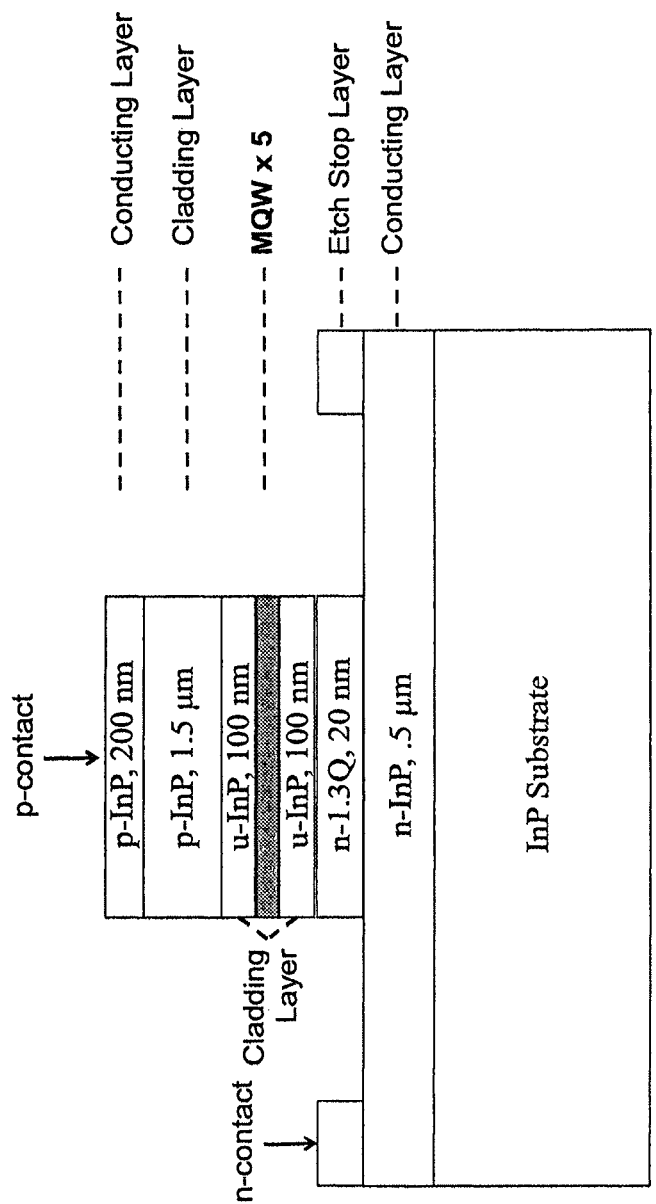
FIG. 9 illustrates one wafer stack design for a photonic integrated circuit.

In another nonlimiting example, the photonic self-interference canceller depicted in FIG. 2A and FIG. 2B can be fabricated on a single board photonic integrated circuit (PIC). The PIC provides advantages in size, weight, power, cost, reliability, and volume. One approach to monolithically integrate all the components is using an Indium phosphide (InP) platform that combines both active devices and passive devices. The active devices are E-O-Tx 13 and 14, O-E-Rx 12, and O-E-BRX 15. The passive devices are TD 20, VAtt 22, and splitter 18. A simplified version of the potential wafer stack for the PIC is shown in FIG. 9 in the form of a waveguide structure. It features an etch-stop layer below the multiple quantum well (MQW) epitaxial layers so that top-side n-contacts can be fabricated. Top-side contacts set the stage for high-speed RF functionality such as travelling-wave electrodes and bump bonding to minimize parasitics.

Another approach for the fabricating the PIC is manufacturing a III-V-silicon hybrid platform with wafer bonding. This approach revolves around the advantages of processing the III-V material only after it has been bonded onto the silicon-on-insulator (SOI) substrate. Wafer bonding alleviates the time-consuming and costly alignment of two already processed chips in the case of flip-chip bonding, and is significantly more tolerant to thermal and lattice mismatches between two dissimilar materials than other bonding techniques. Two examples of wafer bonding include direct bonding and adhesive bonding. Direct bonding consists of creating atomically smooth surfaces between the two bonding materials, relying initially on Van der Waals forces and hydrogen bonding, and later on covalent bonding to establish a strong bond. Low temperature and strong bond strength can be achieved by first treating both surfaces with an ozone plasma. However, the process requires that the interfaces be cleaned to near perfection; even a 1 μm diameter particle left on the surface can produce a 1 mm radius void of non-bonded area, therefore weakening the bond. The process is very sensitive to micro-roughness and surface particles.

Adhesive bonding uses a polymer to bond the two materials. This bonding agent planarizes the bonding interface, reducing the stringent sub-nanometer surface smoothness requirement in direct bonding to a several nanometer smoothness requirement. In addition, the bonding agent reduces lattice mismatch induced stress between the two bonded materials. Adhesive wafer bonding consists of five main steps: (1) SoI device fabrication, (2) III-V and SoI substrate cleaning, (3) polymer coating and planarization, (4) III-V die attachment and polymer curing, and finally (5) III-V substrate removal and device fabrication.

Although the invention has been described in terms of the above specific embodiments, those skilled in the art will recognize many obvious modifications and variations. All such modifications and variations are intended to come within the scope of the following claims.

REFERENCES

1. J. Tsimbinos, "Identification and Compensation of Nonlinear Distortion," University of South Australia, 1995, which is incorporated by reference herein.
2. Y. Yang, A. Motafakker-Fard, and B. Jalali, "Linearization of ADCs via digital post processing," 2011 *IEEE Int. Symp. Circuits Syst.*, no. 5, pp. 989-992, May 2011, which is incorporated by reference herein.

The invention claimed is:

1. An RF communication system capable of simultaneous transmitting and receiving over multiple bands comprising:
   a. at least one transceiver capable of transmitting a wideband RF transmit signal and receiving a wideband RF receive signal;
   b. a photonic interference canceller comprising:
      i. a first electro-optical transmitter configured to modulate the wideband RF transmit signal to an optical transmit signal;
      ii. a second electro-optical transmitter configured to modulate the wideband RF receive signal to an optical receive signal;
      iii. a time delay circuit used to control the propagation time of a first copy of the optical transmit signal relative to the optical receive signal;
      iv. a variable attenuator to control the relative power of the first copy of the optical transmit signal;
      v. a first opto-electrical receiver configured to demodulate a second copy of the optical transmit signal to an RF signal;
      vi. a second opto-electrical receiver configured to generate a filtered RF receive signal from which a transmit signal component has been canceled, wherein the second opto-electrical receiver is a balanced receiver receiving as inputs and demodulating (1) the first copy of the optical transmit signal, and (2) the optical receive signal, and combining the demodulated signals in order to generate the filtered RF receive signal; and
   c. at least one wideband antenna directing the wideband RF receive signal to the transceiver and/or radiating the wideband RF transmit signal.

2. The RF communication system according to claim 1, wherein a coupler combines the optical receive signal and the first copy of the optical transmit signal prior to the second opto-electrical receiver generating the filtered RF receive signal.

3. The RF communication system according to claim 1, wherein the photonic interference canceller further comprises a splitter directing, as a first output from the splitter, a lower power transmit signal to the time delay circuit, thereby forming a reference path.

4. The RF communication system according to claim 3, wherein the splitter directs, as a second output from the splitter, a higher power transmit signal to the second opto-electrical receiver.

5. The RF communication system according to claim 3, wherein the reference path further comprises the variable attenuator and a delay line modifying the optical transmit signal.

6. The RF communication system according to claim 1, wherein the optically modulated transmit signal is converted back to a RF transmit signal and directed to a coupler which is positioned in a path the RF receive signal travels from the wideband antenna.

7. The RF communication system according to claim 6, wherein a single antenna is connected to the coupler for transmitting the RF transmit signal and receiving the RF receive signal.

8. The RF communication system according to claim 1, wherein (i) the optical transmit signal is converted back to the wideband RF transmit signal and directed to a first antenna; and (ii) a second antenna is connected to a path which directs the wideband RF receive signal to the second electro-optical transmitter.

9. The RF communication system according to claim 8, wherein the antennas have a wideband performance for more than 1 MHz passband where the operating characteristics in gain and radiation pattern are within an about 1 dB variation.

10. A method of cancelling the interference of an interfering transmit signal comprising the steps of:
    a. transmitting an RF transmit signal from a transceiver;
    b. splitting the RF transmit signal into a first and second copy;
    c. directing the second copy of the RF transmit signal to a first antenna;
    d. optically modulating the first copy of the RF transmit signal;
    e. optically modulating an RF receive signal routed from the first antenna or a second, co-site located antenna;
    f. delaying the optically modulated RF transmit signal relative to the optically modulated RF receive signal and attenuating the optically modulated RF transmit signal;
    g. demodulating the optical first copy of the RF transmit signal and the optical RF receive signal back to an RF signal using an optical-electrical balanced receiver; and
    h. combining the first copy of the RF transmit signal and RF receive signal in order to cancel interference from the RF transmit signal.

11. The cancelling interference method according to claim 10, further comprising the step of inverting the RF transmit signal in step (g).

12. The cancelling interference method according to claim 10 further comprising modulating the RF transmit signal using an electro-optic modulator in conjunction with a laser diode.

13. The cancelling interference method according to claim 10 further comprising modulating the RF transmit signal using an electro-optic modulator in conjunction with a plurality of laser diodes.

14. The cancelling interference method according to claim 10 further comprising modulating the RF transmit signal using an electro-absorption modulator in conjunction with at least one laser diode.

15. A method of cancelling the interference of an interfering transmit signal comprising the steps of:
   a. transmitting an RF transmit signal from a transceiver;
   b. splitting the RF transmit signal into a first and second copy;
   c. directing the second copy of the RF transmit signal to a first antenna;
   d. optically modulating the first copy of the RF transmit signal;
   e. optically modulating an RF receive signal routed from the first antenna or a co-site located second antenna;
   f. delaying the optically modulated RF transmit signal relative to the optically modulated RF receive signal and attenuating the optically modulated RF transmit signal;
   g. combining the optically modulated first copy of the transmit signal and the receive signal to a combined signal in order to cancel interference from the transmit signal; and
   h. demodulating the combined optical signal back to an RF signal and directing to the transceiver.

16. The cancelling interference method according to claim 15, further comprising the step of inverting the RF transmit signal in step (d).

17. The cancelling interference method according to claim 16 further comprising modulating the RF transmit signal using a laser diode.

18. The cancelling interference method according to claim 15, wherein the step of attenuating the optically modulated RF transmit signal is carried out utilizing a variable attenuator.

* * * * *